Patented May 7, 1929.

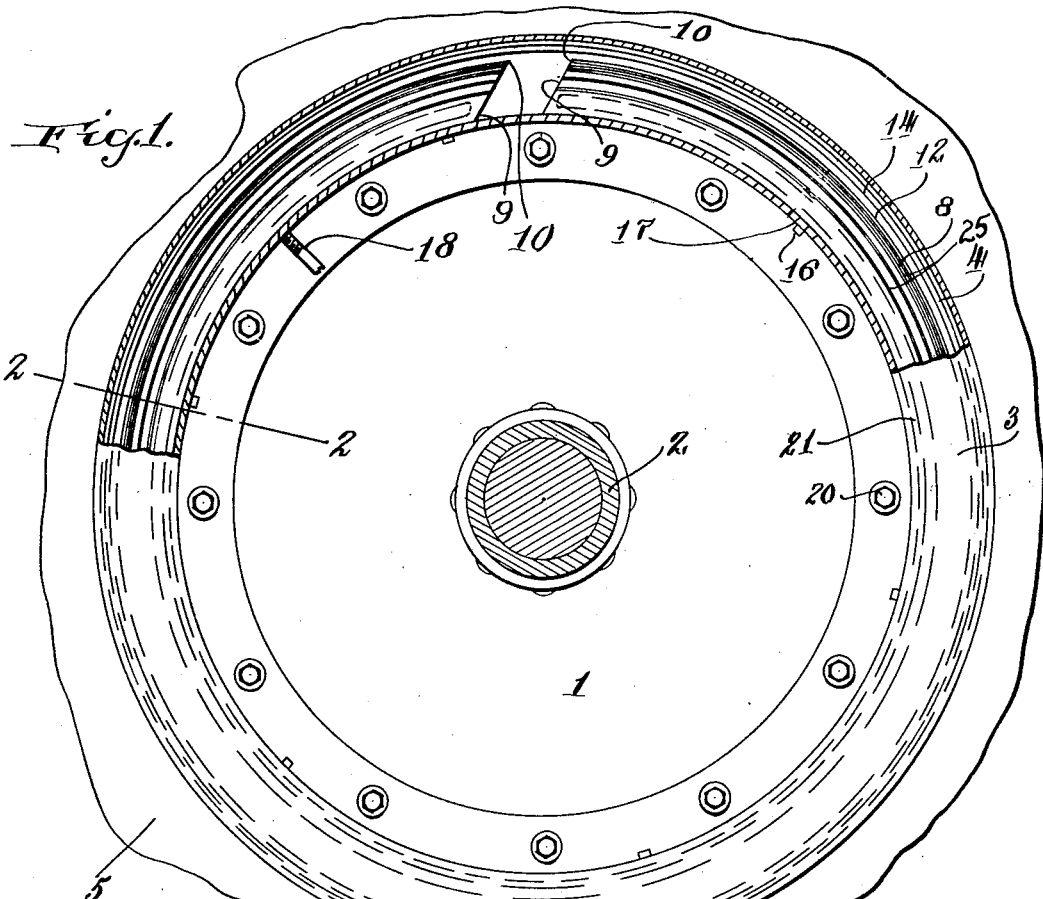
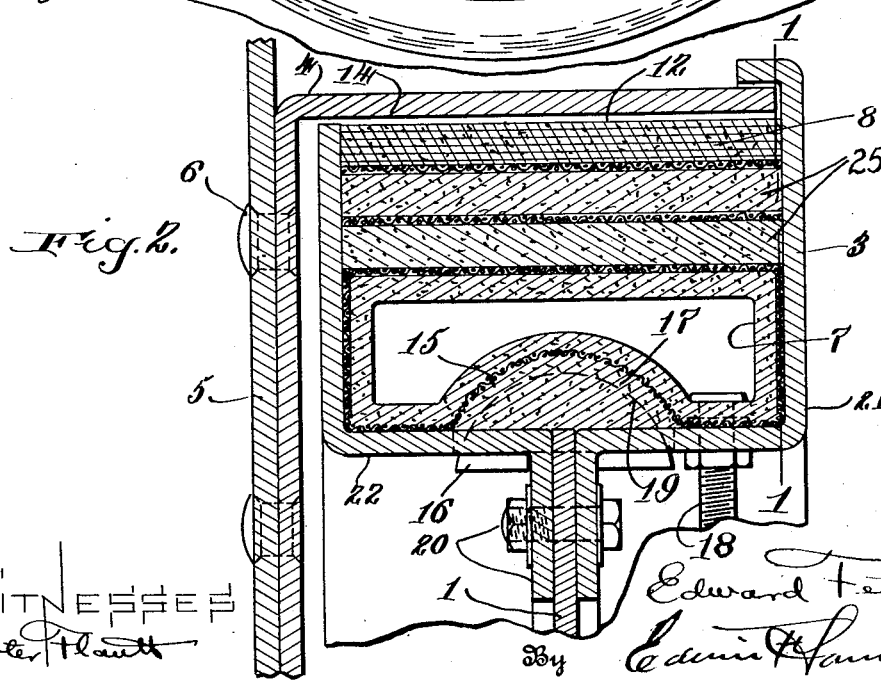

1,711,675

UNITED STATES PATENT OFFICE.

EDWARD FETTER, OF BALTIMORE, MARYLAND.

FLUID-PRESSURE BRAKE.

Application filed November 2, 1927. Serial No. 230,413.

The invention relates to fluid pressure brakes of the type in which an annular bag supported adjacent the brake drum is inflated to apply braking pressure to the drum.

An important feature of the present device resides in the provision of an annular or arcuate bag of the butt or closed ended type and a circular or arcuate friction member or brake band between the bag proper and the drum, likewise having spaced ends, the spacing of the ends providing for a free contraction and expansion of the braking members, i. e., the bag and brake band or lining whereby the brakes are more easily and efficiently applied and released.

In the accompanying drawings I have illustrated a brake construction embodying the features of my invention in the preferred form.

In the drawings:

Figure 1 is a side elevation of the brake taken from the inside, the brake housing being cut away on the line 1—1 of Figure 2.

Figure 2 is a section on a radial plane indicated by line 2—2 of Figure 1.

Referring to the drawings by numerals, each of which is used to indicate the same or similar parts in the different figures, the construction shown comprises a non-rotary support 1 which may be secured to the axle housing 2 or any convenient non-rotary member, the brake housing 3 being in the form of an annular channel member, secured to the support 1. The construction shown also includes a brake drum 4 which may be of the conventional type, the same being secured to the wheel in any suitable manner to rotate therewith. The plate 5 may be a portion of a disk wheel to which the drum 4 is secured in any suitable manner, as by means of rivets 6.

The brake members comprise, in the form of the invention shown, an annular or arcuate butt ended inflatable bag 7 and a brake band 8. The annular bag 7 is seated in the housing 3, being preferably formed with separate closed ends 9 to provide for the convenient contraction and expansion of the bag to apply and release the brake.

In the form of the invention shown, the brake band 8, which may be of any suitable friction and insulating material as brake lining, overlies and is secured to the bag as illustrated and is formed with spaced ends 10 overlying the corresponding ends of the bag. The bag and band are thus each in the form of a substantially complete split ring. In order to provide for the release of the brakes, the bag is so formed that the outside diameter of the combined bag and band measured to the friction surface 12 of the band is normally less than the diameter of the inside surface or friction surface 14 of the drum so that the brake is normally released, being applied only when the bag is inflated, the term inflation having reference to increase of fluid pressure inside the bag whereby the bag is expanded, the fluid being either liquid or air. In the form of the invention shown, the brake band proper 8 is supported on the bag 7 by additional material, indicated by the layers or bands 25. This material may consist of brake lining or other heavy resistive fabric and it constitutes, in effect, a mere thickening of the brake band 8.

In the form of the invention shown, the bag is formed with a solid inner circumferential rib 15 which, as shown, is utilized as an engaging means for the keys 16 which are seated in radial slots 17 in the housing projecting into corresponding slots 19 in the rib 15 provided for this purpose.

Fluid under pressure is supplied to the bag in any convenient manner as by way of radial pipe or tube 18 leading thereto and extending radially through the housing 3, as illustrated in Figures 1 and 2. This tube is connected to a fluid pressure cylinder or other source of fluid under pressure, not shown.

To apply the brake, fluid pressure is admitted by way of the tube 18, inflating the bag and pressing the band 8 against the drum 4 uniformly throughout its length and width. When the pressure is released, the bag 7 which has been inflated, as aforesaid, is permitted to relax and recovering its normal contour the band is removed from contact with the drum, releasing the brake.

The separate ends 9, 9 and 10, 10, provide a free motion of the bag and the band whereby the brake is easily applied and released as aforesaid. The construction also has the important advantage that new bands and bags may be installed without removing the wheel. In the form shown the housing 3 may be opened for this purpose by removing bolts 20 which hold sections 21 and 22 in position on disk 1. The keys 16 prevent rotation of the bag and while there is a tendency to elongation, the space between the ends 9, 9, is sufficient to take this up and the stretch of the bag is, in fact, very slight, as it is preferably made of fabric and rubber closely resembling the construction of the shoes or outer casings of the pneumatic tires used on motor vehicles, though of considerably lighter construction. This material is very tough and has little, if any, tendency to stretch or elongate. Also, the slots 17 in the rib 15, which is of canvas and rubber, are amply sufficient to hold the bag when confined within the housing, and prevent any harmful rotation.

It is of interest to note that the split ring bag provides for unlimited radial expansion without necessarily increasing the circumferential length of the bag, whereby the brakes may be applied with equal force whether the band is new and of full thickness or considerably worn and of greatly reduced thickness. On the other hand, the closed ring type of bag is subject to the difficulty that to apply braking pressure the peripheral length of the bag must be increased, whereby the extent to which the bag may be expanded in applying the brake is limited.

I have thus described specifically and in detail a brake embodying the features of my invention in the preferred form in order that the nature and operation of the same may be fully understood, however, the specific terms herein are used descriptively rather than in a limiting sense, the scope of the invention being defined in the claims.

What I claim as new and desire to secure by Letters Patent is:

1. A fluid pressure brake comprising a single flexible bag which in operative position is in the form of a substantially complete split ring, a non-rotary support therefor having a surface supporting the bag on one side throughout substantially its entire periphery, a rotary brake member having a cylindrical frictional braking surface on the side of the bag opposite in a radial direction to said supporting surface, means for preventing rotation of the bag, and means for inflating the bag to expand the bag in a radial direction, applying braking pressure to the rotary member throughout substantially the entire length of said frictional braking surface, the split in said bag providing closed separate ends to facilitate expansion of the bag, application and release of the brake.

2. A fluid pressure brake comprising a bag which in operative position is in the form of a substantially complete split ring, a non-rotary support therefor having a surface supporting the bag on one side throughout substantially its entire periphery, a rotary brake member having a circular frictional braking surface on the side of the bag opposite in a radial direction to said supporting surface, a friction band in the form of a split ring between the rotary member and the bag, the band being normally spaced by a slight interval from the rotary brake member to provide for the expansion and contraction of the bag and the application and release of the brake, the split in the bag and band providing free ends which permit the bag to expand freely in a radial direction, and means for inflating the bag to set up a radial pressure between the support and the rotary brake member, pressing the band against the rotary brake member, and means for preventing rotation of the band.

3. A fluid pressure brake comprising an arcuate inflatable bag, a non-rotary support therefor having a supporting surface engaging the bag on one side throughout substantially its entire length, a brake drum on the side of the bag radially opposite the support, a brake band between the bag and the drum, the bag and band being each in the form of a substantially complete split ring to provide for free braking motion, the bag and band being so formed and arranged that the contacting surface of the band is normally spaced away from the drum so that the brake band is normally out of contact, and means for inflating the bag to set up a radial pressure between the support and the band pressing the band against the drum.

Signed by me at Baltimore, Maryland, this 31st day of October, 1927.

EDWARD FETTER.